United States Patent [19]

Turner et al.

[11] 4,425,462

[45] Jan. 10, 1984

[54] DRILLING FLUIDS BASED ON SULFONATED ELASTOMERIC POLYMERS

[75] Inventors: S. Richard Turner; Robert D. Lundberg, both of Bridgewater, N.J.; Thad O. Walker, Humble, Tex.

[73] Assignee: Exxon Research and Engineering Co., Florham Park, N.J.

[21] Appl. No.: 416,937

[22] Filed: Sep. 13, 1982

[51] Int. Cl.$^3$ .................. C08K 3/24; C08L 25/08; C09K 7/02
[52] U.S. Cl. .................. 524/400; 252/8.5 M; 252/8.5 A; 252/8.5 C; 524/423; 524/574; 524/576
[58] Field of Search ............ 252/8.5 M, 8.5 C, 8.5 A; 524/400, 423, 574, 576

[56] References Cited

U.S. PATENT DOCUMENTS

| | | | |
|---|---|---|---|
| 2,217,927 | 10/1940 | Van Campen | 252/8.5 M |
| 2,599,683 | 6/1952 | Abrams et al. | 252/8.5 M |
| 2,801,967 | 8/1957 | Wilson | 252/8.5 M |
| 3,109,847 | 11/1963 | Shaler et al. | 252/8.5 M |
| 3,210,274 | 10/1965 | Caruso | 252/8.5 M |
| 3,222,278 | 12/1965 | Harryman et al. | 252/8.5 A |
| 3,622,513 | 11/1971 | Miller | 252/8.5 M |
| 3,870,841 | 3/1975 | Makowski et al. | 524/314 |
| 3,912,683 | 10/1975 | O'Farrell | 524/574 |
| 4,007,149 | 2/1977 | Burton et al. | 524/574 |
| 4,118,360 | 10/1978 | Makowski et al. | 524/574 |

FOREIGN PATENT DOCUMENTS 682553 10/1979 U.S.S.R. .................. 252/8.5 M

OTHER PUBLICATIONS

International Publication Number WO81/00850, Published under The Patent Cooperative Treaty (PCT) Apr. 2, 1981, 44 pages spec., 5 pages drawings, pp. 1-15 relied upon.

*Primary Examiner*—Ronald W. Griffin
*Attorney, Agent, or Firm*—Richard E. Nanfeldt

[57] ABSTRACT

The present invention relates to sulfonated elastomeric polymers which are copolymers of isoprene and sodium styrene sulfonate or teropolymers of isoprene, styrene and sodium styrene sulfonate wherein these sulfonated polymers function as viscosification agents when added to oil-based drilling muds which are the fluids used to maintain pressure, cool drill bits and lift cuttings from the holes in the drilling operation for oil and gas wells. The sulfonated and elastomeric polymers have about 5 to about 100 meq. of sulfonate groups per 100 grams of the sulfonated elastomeric polymer, wherein the sulfonated groups are neutralized with a metallic cation or an amine or ammonium counterion. A polar cosolvent can optionally be added to the mixture of oil drilling mud and sulfonated elastomeric polymer, wherein the polar cosolvent increases the solubility of the sulfonated elastomeric polymer in the oil drilling mud by decreasing the strong ionic interactions between the sulfonate groups of the sulfonated polymer.

15 Claims, No Drawings

DRILLING FLUIDS BASED ON SULFONATED ELASTOMERIC POLYMERS

FIELD OF THE INVENTION

The present invention relates to sulfonated elastomeric polymers which are copolymers of isoprene and sodium styrene sulfonate or butadiene, styrene and sodium styrene sulfonate, or butadiene and sodium styrene sulfonate or terpolymers of butadiene, styrene and sodium styrene sulfonate or of isoprene, styrene and sodium styrene sulfonate, wherein these sulfonated polymers function as viscosification agents when added to oil-based drilling muds which are the fluids used to maintain pressure, cool drill bits and lift cuttings from the holes in the drilling operation for oil and gas wells. The sulfonated and elastomeric polymers have about 5 to about 100 meq. of sulfonate groups per 100 grams of the sulfonated elastomeric polymer, wherein the sulfonated groups are neutralized with a metallic cation or an amine or ammonium counterion. A polar cosolvent can optionally be added to the mixture of oil drilling mud and sulfonated elastomeric polymer, wherein the polar cosolvent increases the solubility of the sulfonated elastomeric polymer in the oil drilling mud by decreasing the strong ionic interactions between the sulfonate groups of the sulfonated polymer.

BACKGROUND OF THE INVENTION

In the field of drilling in the exploration for oil and gas, an important component is that of the formulation of drilling muds. Drilling muds are the fluids which are used to maintain pressure, cool drill bits and lift cuttings from the holes and vary in composition over a wide spectrum. Generally, drilling muds are based on aqueous formulations or oil-based formulations.

A conventional oil-based drilling mud formulation is comprised of basically the following ingredients: oil (generally No. 2 diesel fuel), emulsifying agents (alkaline soaps and fatty acids), wetting agents (dodecylbenzene sulfonate), water, barite or barium sulfate, (weighting agent), asbestos (employed as viscosification agent) and/or, amine-treated clays (also as viscosification agent).

The above combination of ingredients is generally formulated to possess various weights based primarily on amount of barite added. For example, a typical drilling mud can vary in specific gravity from a range of about 7 pounds per gallon up to 17 pounds per gallon or even greater. This variation in specific gravity is primarily controlled by the amount of barite added. The above formulations perform adequately in a number of applications, primarily those where the use of oil-based drilling muds is dictated by the lack of stability of the formation in which drilling is taking place. For example, in various types of shale formation, the use of conventional water-based muds can result in a deterioration and collapse of the shale formation. The use of the oil-based formulations circumvents this problem. However, it is observed that the current oil-based drilling muds have some significant disadvantages. One disadvantage is that the incorporation of asbestos or asbestos fines can incur significant health problems, both during the mud formulation and potentially during the subsequent use of such formulations. Therefore, it is desirable to eliminate the use of asbestos completely in such drilling muds. On the other hand, the use of substitutes for asbestos in this application has heretofore not been particularly successful in that the resulting viscosification agents must maintain adequate viscosities under the drilling conditions which can involve high temperature and high shear conditions.

There has been a substantial need for a drilling fluid which would exhibit good performance at high temperature in water sensitive formations. Past experience has shown that oil-based drilling fluids can provide good performance in water sensitive formations, and the state of the art systems can perform well up to about 350° F. Typically, in such formations, the failure of the viscosities in current muds is circumvented by the addition of more viscosifier during the circulation of the drilling mud. While this solution is adequate at moderate temperatures, when much higher temperatures are encountered (example: geothermal wells or natural gas wells), the degradation of the viscosifier can be so rapid that the additional costs for a viscosifier can be uneconomical. There is a need, therefore, for drilling fluids which can maintain their viscosity and gel strength at temperatures up to and exceeding 400° F. These needs are not adequately met by the current drilling fluids, even with the oil-based drilling muds often employed.

This invention describes an approach to viscosification of oil-based drilling muds which permits the substitution of sulfonated ionomers for asbestos fines and amine clays. The resulting polymer-modified drilling muds display viscosities which are in a desirable range for drilling mud applications, good viscosities at retention after aging and gel strength from room temperature up to temperatures of 400° F. and higher, based on tests conducted for 16 hours at such temperatures.

It appears that until now, there has been no single viscosifier which has been effective at both room temperature and 400° F. for the typical aging period of 16 hours.

In copending application Ser. No. 292,235 entitled, "Drilling Mud Viscosification Agents Based on Sulfonated Ionomers", it was disclosed that sulfonated EPDM terpolymers were effective viscosifiers at room temperature, but were deficient at 400° F. In copending application Ser. No. 292,333 entitled, "High Temperature Drilling Fluids Based on Sulfonated Thermoplastic Polymers", it was disclosed that sulfonated polystyrene polymers were effective viscosifiers at 400° F. but were deficient at room temperature. In copending application Ser. No. 416,936 entitled, "Improved Drilling Fluids Based on a Mixture of a Sulfonated Thermoplastic Polymer and a Sulfonated Elastomeric Polymer", it was disclosed that a mixture of sulfonated EPDM terpolymers and sulfonated polystyrene polymers was an effective viscosifier both at room temperature and 400° F. for the typical aging period of 16 hours.

The instant invention discloses a class of sulfonated elastomeric polymers which are effective viscosifiers at both room temperature and 400° F. These sulfonated elastomeric polymers are copolymers of isoprene/sodium styrene sulfonate, or butadiene/sodium styrene sulfonate or chloroprene/sodium styrene sulfonate or terpolymers of isoprene/styrene/sodium styrene sulfonate butadiene/styrene/sodium styrene sulfonate. These copolymers and terpolymers provide excellent gel strengths at both room temperature and 400° F.

It is believed that these sulfonated polymers are not soluble in either the hydrocarbon phase or the aqueous phase of a formulated mud and; therefore, the polymer is probably located at the interface. As a consequence, these sulfonated polymers are extremely effective viscosifiers even at quite low levels.

A second facet of the instant invention relates to the use of these materials in formulations which employ high concentrations of salt in the aqueous phase. The sulfonated elastomeric polymers of this invention lose some of their efficacy in salt water. It has been found that the combination of a suitable non-ionic emulsifier with the sulfonated polymers gives formulations which are effective with salt water. Therefore, these systems give formulations which perform well at high temperatures and in the presence of salt water phases, which is a highly desired objective in the drilling fluids industry.

SUMMARY OF THE INVENTION

The present invention relates to sulfonated elastomeric polymers which are copolymers of isoprene and sodium styrene sulfonate or terpolymers of isoprene, styrene and sodium styrene sulfonate, wherein these sulfonated polymers function as viscosification agents when added to oil-based drilling muds which are the fluids used to maintain pressure, cool drill bits and lift cuttings from the holes in the drilling operation for oil and gas wells. The sulfonated and elastomeric polymers have about 5 to about 100 meq. of sulfonate groups per 100 grams of the sulfonated elastomeric polymer, wherein the sulfonated groups are neutralized with a metallic cation or an amine or ammonium counterion. A polar cosolvent can optionally be added to the mixture of oil drilling mud and sulfonated elastomeric polymer, wherein the polar cosolvent increases the solubility of the sulfonated elastomeric polymer in the oil drilling mud by decreasing the strong ionic interactions between the sulfonate groups of the sulfonated polymer.

GENERAL DESCRIPTION OF THE INVENTION

The present invention describes a new class of viscosification agents for oil-based drilling muds which are used during operation of gas and oil wells, wherein these viscosification agents are sulfonated elastomeric polymers selected from the group consisting of copolymers of isoprene/sodium styrene sulfonate and terpolymers of isoprene/styrene/sodium styrene sulfonate. The oil-based drilling muds of the instant invention minimally comprise, but can also include other additives; an organic liquid such as an oil, fresh water or salt water, an emulsifier, a wetting agent, a weighting material and a sulfonated elastomeric polymer. In general, the oil-based drilling mud has a specific gravity of about 7 pounds per gallon to about 20 pounds per gallon, more preferably about 10 to about 16, and most preferably about 12 to about 16. A typical oil-based drilling mud, as envisioned by the instant invention, comprises: an oil; about 1 to about 10 parts by weight of water per 100 parts by weight of the oil, more preferably about 3 to about 5; and 20 to about 50 lb/bbl. of an emulsifier and/or supplementary emulsifier; about ½ to about 5 lb/bbl. of a wetting agent and weighting material (barium sulfate or barite) necessary to give the desired mud density; which comprises less than about 800 lb/bbl. of barium sulfate, more preferably about 5 to about 750, and most preferably about 10 to about 700; and about 0.25 to about 4 lb/bbl. of the sulfonated elastomeric polymer.

The oil employed in the oil-based drilling mud is generally a No. 2 diesel fuel, but it can be other commercially available hydrocarbon solvents such as kerosene, fuel oils or selected crude. If crudes are used, they should be weathered and must be free of emulsion breakers.

Typical, but non-limiting examples of suitable emulsifiers which can be readily employed are magnesium or calcium soaps of fatty acids.

Typical, but non-limiting examples of a suitable wetting agent which can be readily employed is an alkylaryl sulfonte.

Typical, but non-limiting examples of a weighting material which can be readily employed is barite or a barium sulfate which may optionally be surface-treated with other cations, such as calsium.

The neutralized sulfonated co- or terpolymers employed in the oil-based drilling muds are formed by a free radical process.

The solid sulfonated elastomeric co- or terpolymer of the instant invention comprises at least 80 percent by weight of at least one conjugated diene having from 4 to 12 carbon atoms and a minor proportion of a metal or amine neutralized sulfonate monomer characterized by the formulae:

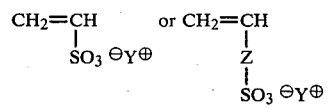

wherein Z is φ or

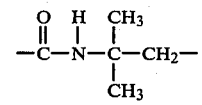

and wherein $Y\oplus$ is a cation selected from Groups IA, IIA, IB and IIB of the Periodic Table or an amine of the formula:

where $R_1$, $R_2$ and $R_3$ can be aliphatic groups of $C_1$ to $C_{12}$ or hydrogen, the co- or terpolymer being water insoluble having about 18 to about 100 meq. of sulfonate groups per 100 grams.

The monomers used in the free radical emulsion copolymerization process are conjugated dienes which are copolymerized with sulfonate-containing monomers.

In general, the conjugated diene with or without styrene and sulfonate-containing monomer are dispersed in a water phase in the presence of a suitable free radical initiator and a suitable surfactant, wherein the temperature is sufficient to initiate polymerization. The resultant latex is coagulated, usually by the addition of an aqueous salt solution, and the recovered co- or terpolymer is washed with water and subsequently dried under vacuum at room temperature. Alternatively, the latex can be coagulated by the addition of methanol.

The sulfonated elastomeric co- or terpolymers formed from the free radical emulsion copolymerization process of the instant invention can be generally described as having an $\overline{M}_n$ of about 5,000 to about 20,000, more preferably about 10,000 to about 100,000. The co- or terpolymers of the instant invention contain about 18 to about 100 meq. of sulfonate groups per 100 grams of polymer, more preferably about 18 to about 90, and most preferably about 20 to about 80. Typical, but non-limiting examples of the copolymers which can be formed by the instant free radical emulsion copolymerization process are: butadiene/sodium styrene sulfonate copolymer, isoprene/sodium styrene sulfonate copolymer, butadiene/sodium vinyl sulfonate, isoprene/sodium vinyl sulfonate copolymer. Obviously, a large number of copolymers and even terpolymers can be formed by the instant free radical copolymerization process. Typically, the copolymerization of any conjugated diene can be readily copolymerized with any sulfonate-containing monomer, as is defined herein. Terpolymers with styrene, acrylonitrile, vinyl chloride as the termonomers with the aforementioned dienes are also contemplated provided that no more than 25 weight percent of the termonomer is combined therein.

The conjugated dienes are generally defined as acyclic conjugated dienes containing from about 4 to about 10 carbon atoms, more preferably about 4 to about 6 carbon atoms. Typical, but non-limiting examples of acyclic conjugated dienes are piperidene, ,3-butadiene, isoprene 2,3-dimethyl-1,3-butadiene, 1,3-pentadiene, 2-methyl-1,3-pentadiene, 2,3-dimethyl-1,3-pentadiene, 3-methyl-1,3-pentadiene, 2-phenyl butadiene, chloroprene and piperidene. Typical, but non-limiting examples of cyclic conjugated dienes are cyclopentadiene and methyl cyclopentadiene. The preferred conjugated dienes of the instant invention are selected from the group consisting of 1,3-butadiene, isoprene, chloroprene. In the formation of the sulfonate-containing copolymer, one copolymerizes one of the aforementioned conjugated dienes with the sulfonate-containing monomer. Sulfonate-containing terpolymers can be readily formed by copolymerizing the sulfonate-containing monomer with a mixture of two of the above-identified conjugated dienes.

The sulfonate-containing monomers which are water soluble can be generally described as monomers having an unsaturation and a metal or amine sulfonate group. The metal or amine neutralized sulfonate monomer is characterized by the formulae:

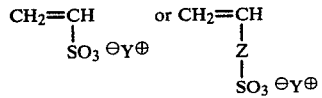

wherein Z is φ or

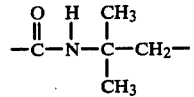

and wherein $\ominus Y\oplus$ is a cation selected from Groups IA, IIA, IB and IIB of the Periodic Table or an amine of the formula:

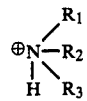

where $R_1$, $R_2$ and $R_3$ can be aliphatic groups of $C_1$ to $C_{12}$ or hydrogen. Particularly suitable metal cations are sodium, potassium and zinc, and an especially preferred metal cation is sodium. A typical, but non-limiting example of suitable sulfonate-containing monomers is:

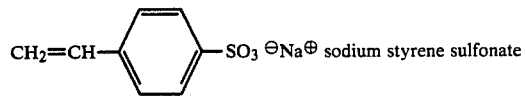

An especially preferred sulfonate-containing monomer is metal styrene sulfonate. The molar ratio of sulfonate-containing monomer to conjugated diene is about 1/200 to about 1/5, more preferably about 1/150 to about 1/6, and most preferably about 1/100 to about 1/9.

A variety of free radical catalysts can be employed in this invention including the water soluble varieties, potassium persulfate, ammonium persulfate, etc. and the oil/water soluble redox couples such as benzoyl peroxide/$(NH_4)_2FeSO_4$.

The surfactants employed for this invention are varied and well-known in the art. The typical emulsifiers or surfactants can be employed; however, some are more effective than others in generating latices of better stability. A preferred emulsifier is sodium lauryl sulfate.

Buffering agents can be used but are not necessary in the instant polymerization process. If used, they are selected from the group consisting of sodium carbonate, ammonia, sodium acetate, trisodium phosphate, etc. These buffering agents are employed at a concentration of about 0.1 to about 5 grams per 100 grams water employed in the emulsion system.

Chain transfer agents can be readily employed in the instant polymerization process for controlling the molecular weight of the resultant copolymer. The concentration of chain transfer agent is from 0 to about 1.0 grams per 100 grams of the combined weight of the sulfonate-containing monomer and the conjugated diene.

The free radical emulsion copolymerization of the water soluble sulfonate-containing polymer and the conjugated diene yields a stable latex, wherein the resultant water insoluble co- or terpolymer is either not covalently cross-linked or covalently corss-linked at low levels, and possesses substantial ionic corss-linking, and has about 18 to about 100 meq. of sulfonate groups per 100 grams of polymer, more preferably about 18 to about 90. The resultant latex can be coagulated by the addition of an aqueous salt solution to the emulsion at a volume ratio of the aqueous salt solution to total volume of the emulsion of about 10 to about 0.5, more preferably about 3 to about 0.7, and most preferably about 2 to about 1. The water insoluble co- or terpolymer is recovered by filtration and substantially washed with water and dried under vacuum conditions. Alternatively, the polymer can be coagulated by precipitation with alcohol such as methanol.

Alternatively, a latex of a sulfonated polymer as described in U.S. Pat. Nos. 3,912,683 and 4,007,149, which are herein incorporated by reference, could be readily employed as a convenient method of introducing the sulfonated polymer into the oil-based drilling mud.

It has been observed that the sulfonated polymers formed by sulfonation often do not readily dissolve in hydrocarbons such as diesel oil or solvent 100 neutral and similar hydrocarbon solvents. The reason that these materials do not readily dissolve is due to the strong ionic interactions which persist in these sulfonated polymers.

It has been observed that the use of appropriate polar cosolvents can dramatically aid in the preparation of such solutions. The need for such cosolvents is most dramatically demonstrated with sulfonated polymers having sulfonate contents significantly above 15 meq. per 100 grams of the sulfonated polymer. Examples of such cosolvents are aliphatic alcohol hexanol, decanol and tridecyl alcohol employed at levels of from about 1 up to 20 parts by weight per 100 parts by weight of the oil employed in the drilling mud. The use of these cosolvents permits a more rapid dissolution process and a more complete solution from polymers which would normally be insoluble in a hydrocarbon diluent. It has also been observed at lower sulfonate levels, that is, 5 to 15 meq. or even higher per 100 grams of sulfonated polymer, that these polymers can be dissolved in the absence of such cosolvents. Cosolvents which are suitable in this invention have been described in U.S. application Ser. No. 930,044 now abandoned, which is herein incorporated by reference.

The polar cosolvent will have a solubility parameter of at least about 8.5, more preferably at least about 9.0 and may comprise from 0.1 to 40, preferably 0.5 to 20 weight percent of the total mixture of organic liquid, ionomeric polymer and polar cosolvent. The solvent system of polar cosolvent and organic liquid, in which the neutralized sulfonated polymer is dissolved, contains less than about 15 weight percent of the polar cosolvent, more preferably about 2 to 10 weight percent, and most preferably about 2 to about 5 weight percent. The viscosity of the solvent system is less than about 1,000 cps, more preferably less than about 800 cps and most preferably less than about 500 cps.

Normally, the polar cosolvent will be a liquid at room temperature; however, this is not a requirement. It is preferred, but not required, that the polar cosolvent be soluble or miscible with the organic liquid at the levels employed in this invention. The polar cosolvent is selected from the group consisting essentially of alcohols, amines, di- or trifunctional alcohols, amides, acetamides, phosphates, or lactones and mixtures thereof. Especially preferred polar cosolvents are aliphatic alcohols such as butanol, hexanol, octanol, decanol, dodecanol tridecyl alcohol, 2-ethyl hexanol, etc.

DETAILED DESCRIPTION OF THE PREFERRED EMBODIMENT

EXAMPLE 1

EMULSION COPOLYMERIZATION OF ISOPRENE AND SODIUM STYRENE SULFONATE

A 250 ml. glass pressure bottle was charged with 1.6 g. sodium lauryl sulfate, 60 ml. distilled and deareated water, 25 g. of isoprene, 2.0 g. of sodium styrene sulfonate, 0.17 g. of dodecyl thiol and 0.1 g. of potassium persulfate. The bottle was sealed under nitrogen with a two-hole crown cap containing a rubber septum. The bottle was placed into a safety screen in a thermostated water shaker bath at 50° C. Shaking was immediately commenced. After an 8-hour reaction time, the bottle was removed and 3 ml. of a methanolic "shortstop" solution of 0.024 g. hydroquinone and 0.036 g. of a oxidation stabilizer 2,6-di-t-butyl-4-methylphenol (DBMP) was added via a syringe. The bottle was again shaken for an additional 10 minutes, cooled, and then opened. This emulsion was steamed to remove residual isoprene monomer. The copolymer emulsion was next added to a stirred solution of 0.15 g. DBMP of 500 ml. of methanol. Approximately 20 g. of NaCl was then added to coagulate the emulsion. The resulting white crumb was isolated by using an 80 mesh screen and a dental rubber dam. The copolymer was washed 3 times with 500 ml. of distilled water and finally rinsed with 200 ml. of methanol. The elastomeric white crumb was placed in a vacuum oven at 40° C. for overnight drying. This process yielded 21.71 g. (80.4%) of the polymer containing 0.56 wt. % sulfur which is equivalent to 1.22 mole % NaSS in the copolymer.

EXAMPLE 2

Preparation of Styrene, Isoprene, Sodium Styrene Sulfonate Terpolymer

A 250 ml. glass pressure bottle was purged with nitrogen and then charged with 60 ml. of deareated distilled water, 2 g. ($9.7 \times 10^{-3}$ mol.) of sodium styrene sulfonate, 4 g. ($3.8 \times 10^{-2}$ mol.) of styrene, 25 g. ($3.7 \times 10^{-1}$ mol.) of isoprene, 0.1 g. of potassium persulfate and 0.17 g. of dodecyl thiol. After these materials were charged, the flask was sparged with nitrogen, capped and put into a 50° C. shaker bath and agitated for 6 hours. The reaction was "shortstopped" with a methanolic hydroquinone solution. After cooling the terpolymer was recovered by coagulating the reaction emulsion in methanol containing about 0.3% 2,6-di-t-butyl-4-methyl phenol as a stabilizer. The polymer was recovered and dried at 40° C. in a vacuum oven overnight. A white rubbery solid (18.57 g.) was obtained. This terpolymer was found to contain 0.43% S by weight.

EXAMPLE 3

Oil-based drilling muds were prepared using conventional laboratory methods. A typical mud was prepared by mixing 205.82 g. of No. 2 diesel oil, 34.76 g. Oil Faze (Magcobar), 1.5 g. SEll and 1.5 g. DV33 Magcobar). To this mixture was added 10 g. of $CaCl_2$ in 21 ml. of water. The mud was weighted with 226.35 g. of Barite and then 4.4 g. of additional $CaCl_2$ were added. The sodium salt of the isoprene/sodium styrene sulfonate copolymer (0.8 mole % sulfonate units) was added at a 2 lb/bbl treat rate, equivalent to 2.2 g. The mud was left overnight at room temperature to insure chemical equilibrium. Aliquots were aged at 150° F., 300° F. and 400° F. for 16 hours in pressurized cells. The cells were cooled to room temperature and then the rheological properties of the mud were measured on a Fann Model 35 viscometer at 115° F. The results for this test are shown in Table I, Column II.

The drilling muds were made without the isoprene/sodium styrene sulfonate, the results of which are summarized in Table I, Column I. Drilling mud formulas were made wherein there was 1.2 mol % sulfonate and 1.6 mol % sulfonate units, the results being summarized in Table I, Columns III and IV.

TABLE I

| | Isoprene/NaSS Copolymers as Oil Mud Viscosifier* | | | | | | | | | | | |
|---|---|---|---|---|---|---|---|---|---|---|---|---|
| | Control | | | 0.8 mol % NaSS | | | 1.2 mol % NaSS | | | 1.6% mol % NaSS | | |
| Temperature | 150° C. | 300° C. | 400° C. | 150° C. | 300° C. | 400° C. | 150° C. | 300° C. | 400° C. | 150° C. | 300° C. | 400° C. |
| 600 rpm viscosity | 42 | 39 | 39 | 57 | 62 | 62 | 130 | 116 | 100 | 143 | 114 | 102 |
| yield point | 8 | 0 | 1 | 11 | 4 | 4 | 40 | 24 | 14 | 41 | 24 | 14 |
| 0 gel strength | 3 | 1 | 1 | 3 | 3 | 3 | 13 | 7 | 3 | 14 | 6 | 6 |
| 10 gel strength | 4 | 2 | 12 | 6 | 4 | 5 | 23 | 15 | 8 | 24 | 13 | 13 |

*2 lb/bbl treat rate

What is claimed is:

1. An oil-based drilling mud which comprises:
   (a) an organic liquid substantially immiscible with water;
   (b) about 1 to about 10 parts by weight of water per 100 parts by weight of the organic liquid;
   (c) about 20 to about 50 lb/bbl. of emulsifier;
   (d) weighting material necessary to achieve the desired density; and
   (e) about 0.25 to about 4.0 lb/bbl. of a water insoluble neutralized sulfonated elastomeric polymer, said neutralized sulfonated elastomeric polymer having about 5 to about 100 meq. of sulfonate groups per 100 grams of the neutralized sulfonated elastomeric polymer, wherein said sulfonated elastomeric polymer is selected from the group consisting of copolymers of isoprene/sodium styrene sulfonate butadiene/sodium styrene sulfonate, chloroprene/sodium styrene sulfonate and terpolymers of isoprene/sodium styrene sulfonate/styrene and butadiene/sodium styrene sulfonate/styrene.

2. A drilling mud according to claim 1 wherein the sulfonate groups of said neutralized sulfonated elastomeric polymer are neutralized with a counterion selected from the group consisting of antimony, iron, aluminum, lead and Groups IA, IIA, IB and IIB of the Periodic Table of Elements.

3. A drilling mud according to claim 1 wherein the sulfonate groups of said neutralized sulfonated elastomeric plastic are neutralized with a counterion selected from the group consisting of zinc, magnesium and sodium.

4. A drilling mud according to claim 1 wherein the sulfonate groups of said neutralized sulfonated elastomeric polymer are neutralized with zinc counterion.

5. A drilling mud according to claim 1 wherein said neutralized sulfonated elastomeric polymer is isoprene co-sodium styrene sulfonate.

6. A drilling mud according to claim 1 further including a wetting agent wherein said wetting agent is an alkylaryl sulfonate.

7. A drilling mud according to claim 1 wherein said weighting material is barite or barium sulfate.

8. A drilling mud according to claim 1 wherein the concentration level of said weighting material is sufficient to give said drilling mud a specific gravity of about 7 pounds per gallon to about 20 pounds per gallon.

9. A drilling mud according to claim 1 wherein said organic liquid is an oil.

10. A drilling mud according to claim 1 wherein said organic liquid is a hydrocarbon solvent.

11. A drilling mud according to claim 1 wherein said emulsifier is a magnesium or calcium soap of a fatty acid.

12. A drilling mud according to claim 1 which further includes a polar cosolvent.

13. A drilling mud according to claim 1 wherein said water is salt water.

14. A drilling mud according to claim 1 wherein the concentration of said water is about 3 to about 5 parts by weight per 100 parts by weight of said organic liquid.

15. A drilling mud according to claim 1 wherein said organic liquid is diesel oil.

* * * * *